United States Patent [19]

Hilton et al.

[11] 4,140,801

[45] Feb. 20, 1979

[54] PROCESS OF MAKING POTATO PRODUCTS

[75] Inventors: Barney W. Hilton; Marvi D. Moore, both of Dallas; Bobby J. Longan, Carrollton, all of Tex.

[73] Assignee: Frito-Lay, Inc., Dallas, Tex.

[21] Appl. No.: 810,411

[22] Filed: Jun. 27, 1977

Related U.S. Application Data

[63] Continuation of Ser. No. 593,271, Jul. 7, 1975, abandoned.

[51] Int. Cl.² ............................................ A23L 1/216
[52] U.S. Cl. ...................................... 426/49; 426/637
[58] Field of Search ...................... 426/49, 52, 60, 62, 426/637

[56] References Cited

U.S. PATENT DOCUMENTS

| | | | |
|---|---|---|---|
| 3,468,673 | 9/1969 | Keller | 426/637 X |
| 3,835,222 | 9/1974 | Wisdom et al. | 426/49 |

*Primary Examiner*—Robert A. Yoncoskie
*Attorney, Agent, or Firm*—Bernard & Brown

[57] ABSTRACT

There are disclosed prefermented, dehydrated potatoes having a low moisture content and a relatively low tendency to brown during frying. Potatoes of undesirably high reducing sugar content are fermented to lower their reducing sugar level before they are extensively dehydrated to a low moisture content, and the resulting products may exhibit less browning upon subsequent rehydration and frying than potatoes whose reducing sugar content is relatively high and is decreased by fermentation after being highly dehydrated to the low moisture content. Also, the potatoes which are fermented before dehydration exhibit a good rate of reducing sugar decline during fermentation, and may have less yeasty or fermentation taste upon frying, than potatoes which are fermented after drying to a low moisture level. Fermentation before extensive dehydration can be adequately and readily achieved even though the potatoes have a relatively high ratio of reducing sugar to total sugar.

13 Claims, No Drawings

PROCESS OF MAKING POTATO PRODUCTS

This is a continuation of application Ser. No. 593,271, filed July 7, 1975 now abandoned.

The present invention relates to the preparation of highly dehydrated potato products exhibiting improved color characteristics upon frying, from potatoes which have undesirably high reducing sugar content. In the process the potatoes are fermented to lower their reducing sugar content, and then dehydrated to a low moisture level. Upon rehydration and frying, the potatoes frequently exhibit comparatively less browning at a given reducing sugar content, than if prepared in the same manner except for the fermentation being accomplished after, rather than before, the high dehydration of the potatoes. The lowering of the reducing sugar level by fermentation of the potatoes in accordance with this invention occurs at a good rate and the products may have less yeasty or fermentation taste upon frying, than potatoes which are fermented after being highly dehydrated. Fermentation before extensive dehydration can be adequately and readily achieved even though the potatoes initially have a relatively high reducing sugar content or a relatively high ratio of reducing sugar to total sugar content.

It has been appreciated that potatoes exhibit browning during frying in proportion to their reducing sugar content. In U.S. Pat. No. 3,835,222, to Wisdom and Hilton, it is disclosed that potatoes having an undesirably high reducing sugar content can be formed into acceptable fried products by fermenting the potatoes in dough form to lower their reducing sugar content before frying. Although the dough can be made by directly dehydrating precooked potatoes to the required moisture content, it is in some instances advantageous to prepare the dough by the use of highly dehydrated potatoes, e.g., potato flakes or potato granules, which have a moisture level below that needed to form a dough. These potato solids are combined with moisture added, for example, as water or as potato solids of higher moisture content, say of at least about 70 weight percent, to provide a dough of desired consistency, and which frequently has a moisture content of about 25 to 60 weight percent. The extensively dried or highly dehydrated potato solids generally have a moisture content below about 15 weight percent, and are conveniently used for a variety of reasons. These solids are usually made in the same geographical area where the potatoes are grown to lessen transportation costs. Since the dried potato solids have a low moisture content, they are relatively light in weight and can be economically and conveniently shipped to various processing locations. Also, the dried solids are quite storage stable when containerized and are thereby preserved from undue physical and chemical change before they are further processed.

The use of these extensively dried solids is not, however, without disadvantages. Highly dehydrated potatoes are frequently made from potatoes of lesser quality having a relatively high reducing sugar content which presents a difficulty, especially if the potatoes are to be fried. Accordingly, there is a need for lowering the reducing sugar content of these potatoes before they are fried, otherwise the products may discolor by turning brown during frying and be commercially unacceptable. This problem has led to the use of fermented doughs made from the highly dehydrated potato solids to lower the reducing sugar level before frying. Fermentation of these doughs has required considerable time, and in many instances, the fermented materials may still undergo some browning during frying, particularly when before fermentation the weight ratio of reducing sugars to total sugars, the weight of reducing sugars, or the weight of fructose present is relatively high. For example, it has been found that when the ratio of reducing sugars to total sugars is at least about 0.6, the reducing sugar content of the dough may be decreased by fermentation only very slowly, and the rate of decrease may even become virtually nil before the reducing sugar content is sufficiently lowered so that the fried products made from the dough have an acceptable color.

The present invention is concerned with improved products having a substantial portion of their solids derived from potatoes of relatively high reducing sugar content. It has been found that the browning characteristics of extensively dried product solids upon frying are significantly reduced when the solids are fermented before they are dehydrated to the low moisture content. The resulting products not only have low browning characteristics, but they may also be improved in taste as compared with similarly fried products made from highly dehydrated potato solids which are not fermented until after drying. The products of the present invention may thus have less of a yeasty or fermentation taste. Also, the rate of fermentation to obtain a product of given reducing sugar content in accordance with the present invention can be faster than when fermenting rehydrated, highly dried potato solids. Fermentation before extensive drying is easily accomplished since the potato solids can be readily handled and may be less sticky or starchy than when fermentation is conducted after the potato solids are highly dehydrated.

In accordance with the present invention, potatoes of undesirably high reducing sugar content, e.g., at least about 1 or 2 weight percent on a total solids basis, are subdivided into smaller potato pieces such as slices, dices or riced or mashed potatoes. The potatoes may be quite high in reducing sugar content, for example, up to about 4 percent or even up to about 7 percent or more. The subdivided potato pieces are in sufficiently subdivided form that the yeast used in fermentation can be effectively mixed with the solids so that fermentation progresses at a satisfactory rate. It is advantageous that the subdivided potato pieces be in relatively small particle form, e.g., be less than about one-half inch in each dimension, and preferably the solids are subdivided to particles of less than about 0.1 inch in diameter, as would occur in ricing, mashing or other systems for comminuting the solids. Such systems are well-known and are generally operated in a manner to avoid undue rupture of the potato cells and concomitant release of starch.

When starting with raw potatoes to perform the method of this invention they can be peeled, and then washed with an aqueous medium after preliminary cutting, for instance as slices or in other subdivided form, and it is preferred to blanch the potato solids to reduce their tendency to brown enzymatically. Blanching is usually done by contacting the potato pieces with hot water or steam for a time sufficient to gelatinize a substantial portion of the starch in the solids. For example, blanching may be done at temperatures of about 80° to 105° C. for a period of about 1 to 30 minutes, and preferably at about 85° to 100° C. for about 10 to 25 minutes.

The potatoes in the state of intermediate or final subdivision for drying may also be given other treatment before or after blanching or at other convenient times, for example the potatoes may be treated with chemical agents such as sulfite or sulfur dioxide to reduce discoloration. The sulfiting treatment is generally done by mixing the potato solids with an aqueous solution of sodium sulfite or bisulfite.

The mixture containing the subdivided potato solids used in fermenting in accordance with the present invention has a total moisture content sufficient for low fermentation to proceed at a substantial or commercially feasible rate. Generally, the mixture has at least about 35 weight percent total moisture whether in free or combined form. The mixture may contain up to about 85 or 90 weight percent moisture, and advantageously contains at least about 50 weight percent moisture. It is preferred that the moisture content of the fermentation mixture be at least about 70 weight percent, for example, in the range of about 75 to 85 weight percent. Most economically and advantageously the moisture of the fermentation medium includes that provided by the raw or preliminary cooked or blanched potatoes. Although, if desired, the potato pieces may be partially dried to an intermediate moisture content, e.g., above about 25 weight percent, and, if necessary or desirable, subsequently rehydrated to the moisture content used in fermentation. Such drying may be conveniently conducted at temperatures of about 80° to 105° C. Prior to fermentation the potatoes are usually not, however, highly dehydrated to below about 15 weight percent moisture, and especially are not dehydrated to below about 10 weight percent moisture, since this may detract from the benefits of the present invention.

The fermentation medium employed in the present invention is, as noted above, aqueous in nature, and yeast may be added to the potato pieces in various desired ways, conveniently in the form of an aqueous slurry. The amount of yeast present in the fermentation mixture is usually minor and is sufficient to lower the reducing sugar content of the potato solids during fermentation to an extent that they have improved resistance to browning during frying. For example, the yeast content of the fermentation mixture may be about 0.1 to 1 weight percent on a solids basis, and it may serve to reduce the reducing sugar content of the potato by at least about 0.5 or 1 weight percent on a solids basis. The time of fermentation is appropriately selected considering factors such as the original sugar content of the solids, the amount of yeast employed, the final reducing sugar content desired, and the like. Effective fermentation usually extends over a period of at least about 0.5 or 1 hour under slightly elevated temperatures in a relatively high humidity atmosphere. Advantageously, fermentation is continued until the reducing sugar content of the potato solids is lowered by at least about 1 weight percent, and preferably the fermented solids contain less than about 1 or less than about 0.5 weight percent of reducing sugar, or even less than about 0.2 weight percent of reducing sugar. To provide a mixture of lower reducing sugar content the fermented solids can be mixed, before or after extensive drying, with potato solids of less reducing sugar content, if this be desired.

One way of determining whether the decrease in reducing sugar content of the potato solids in fermentation is sufficient involves evaluation of the color of fried products made from the fermented, highly dehydrated solids. These products should have a pleasing yellow, golden or slightly deeper visual color, and thus should not be too white or brown. The color of the fried products can be determined by reflectance measurements involving, for example, the use of a spectural reflectance meter equipped with a red filter. In this test, the fried products, for greatest acceptance, should have an Agtron color value in the range of about 65 to 75, and manufacturing specifications such as those used in making potato chips may require that the product have an Agtron color value in the range of about 68 to 74. Fried products of such preferred colors usually can be obtained in accordance with the present invention when the reducing sugar content of the material fried is less than about 0.5 weight percent on a solids basis.

After fermentation, the resulting potato solids made in accordance with the present invention are dried to a substantially lower moisture content. The dried solids are referred to herein as being highly or extensively dehydrated, and generally contain less than about 15 weight percent moisture, preferably less than about 10 weight percent. Drying of the solids is usually not extended to obtain a product of zero moisture level, but rather the dried solids often have a moisture content greater than about 2 weight percent, and preferably in the range of about 4 to 7 weight percent. It is preferred that the fermented solids be dried to the form of potato flakes. The latter type of material is usually made by drum drying techniques after one or more precooking operations on the potato solids. The drying time in making potato flakes generally is less than about 1 minute, or even less than about 30 seconds. In the drum drying operation, it is preferred that the potato mixture fed to the drum contains a moisture content above about 70 weight percent or if desired, the mixture may have a lower moisture content which can be obtained by a predrying step.

In making potato flakes, suitable temperatures are usually higher than those employed in making potato granules, and thus the process of the present invention is particularly advantageous when employed in the manufacture of potato flakes. The use of higher drying temperatures in making flakes seems to result subsequently in more of a browning problem upon frying, and, there may be a greater need to apply the inventive process hereof by fermenting before the flakes are formed so as to avoid the formation of browning precursors during drying. In the flaking operation, drying temperatures are often in the range of about 95° to 180° C.

It is believed that the advantages of the present invention concerned with the browning characteristics of the potato pieces upon frying are the result of fermenting the solids to a low reducing sugar content before they are highly dehydrated to a low moisture level. Although a theory, it appears that during such extensive drying, ingredients of the potatoes including their sugars, e.g. fructose, are modified in such a way that deleterious browning precursors are formed which lead to undesirable effects upon frying. Moreover, and very importantly, when the potato solids have relatively high reducing sugar contents when subjected to such extensive drying, these browning precursors appear to be responsible for causing a prohibitively slow rate of sugar reduction by fermentation of the solids to a given lower reducing sugar content. If, however, the solids are fermented before extensive drying (prefermented), rather than fermented after such drying (postfermented), the prefermented, dried potato solids seem to have an absence of at least some of the browning precursors and exhibit lower browning characteristics upon frying than do the postfermented products. Also, fermentation of the potatoes generally proceeds more readily when it is conducted prior to the extensive drying operation.

The effects and advantages of this invention are particularly applicable and have been most pronounced when the potatoes have a relatively high reducing sugar to total sugar ratio before fermentation, e.g., a ratio by weight of at least about 0.6. Such potatoes are usually also relatively high in reducing sugar content, e.g. at least about 2 percent on a solids basis. Heretofore, fermentation of highly dried potatoes obtained from such sources has resulted in fermented products having reducing sugar contents and characteristics having tendencies which were too great to provide fried potato products of the high quality desired. To achieve high quality standards, the use of such processing was generally restricted to potato sources which would give fermented products having a reducing sugar content below 0.3% on a solids basis. Since fermented products of such low reducing sugar content could frequently not be obtained from highly dried potatoes having a reducing sugar to total sugar ratio of at least about 0.6, the use of the process was limited to potatoes which had a lower ratio, and preferably to those which would upon fermentation for economic periods, yield products of less than about 0.3% reducing sugars. The process of the present invention is not so limited and thus the potatoes fermented may have, for example, a reducing sugar to total sugar ratio of at least about 0.6, and in many instances the fermented products may be made into highest quality fried products even when the fermented potatoes have a reducing sugar content of up to about 0.5% or so on a solids basis.

The fermented, highly dehydrated potato solids made in accordance with the present invention are stable and thus can be conveniently stored until their time of use, and at least for several months without undergoing undue physical or chemical modification. These products are especially adapted for manufacture in one convenient location and distribution to locations of use over a wide geographical area. In the further processing of such potato solids to fried potato products, they can be rehydrated by combination with some form of moisture, whether in a free or combined state. Although the fermented, highly dehydrated solids may be used in their subdivided state as received from the extensive drying operation, the solids are quite often formed into larger pieces, such as chips, french cut and the like. Before the solids are formed into larger pieces, they are generally rehydrated to an intermediate moisture content suitable for the forming operation. Such mixtures are often referred to as doughs, and they may be physically continuous in nature. The doughs are generally no more fluid than the semi-solid or plastic state, and thus are drier than a slurry but wetter than a meal. Often the doughs have a water or moisture content in the range of about 25 to 60 weight percent, and preferably in the range of about 35 to 55 weight percent. The mixtures used in the forming operation contain a substantial amount on a solids basis, for example, at least 25 weight percent, of the foregoing described prefermented highly dehydrated, potato solids, and preferably at least a major amount of the potato solids are represented by such prefermented, dried materials. Other types of solids can be included in the mixture to be formed to larger size particles, for example, raw potatoes which may be blanched or otherwise pretreated or partially or totally dehydrated, or even a minor amount of postfermented, highly dehydrated potato solids. One would not normally incorporate these or other materials in an amount such that upon further processing, as in frying, the formed products would exhibit undue browning or other undesirable characteristics. Among the materials which may be added to the mixture to be formed, are, for example, starch-containing ingredients such as rice, tapioca, potato or wheat flour or starches, antioxidants or other additives, and the solids are preferably composed to a major extent of potato solids.

In the method of this invention, the dough mixture containing the rehydrated, prefermented potato solids can be formed into larger potato pieces by various suitable procedures, for example, the dough may be sheeted, rolled or extruded, and then cut from the dough or otherwise shaped into desirable form for frying. Such form are sometimes referred to in the art as pellets and may be chips, strips or other particles in which one dimension of the chip is generally less than about $\frac{1}{4}$ or $\frac{1}{8}$ inch. The pieces may be formed in shapes similar to french cut potatoes where the cross-sectional dimensions are generally less than about $\frac{1}{4}$ or $\frac{1}{2}$ inch, with the other dimension or length being greater than about $\frac{3}{4}$ or one inch, say up to about 2 to 3 inches or more.

In processing the dough into shaped bodies such as chips, strips or the like, it is preferred to form the dough as a relatively wide, thin ribbon and then cut the ribbon into desired shaped bodies. Extrusion is one method of forming the ribbon and extrusion can be conducted under relatively high pressure to form an extruded ribbon of about 0.01 to 0.1 inch thick. With the dough formed either as a relatively large piece such as a ribbon from which small pieces are cut, or after such small pieces are made, the dough may be conditioned for frying. Such conditioning frequently involves drying the dough to a lower moisture content, for example in the range of about 5 to 25 weight percent, preferably about 10 to 20 weight percent. The lowering of moisture content before frying reduces the amount of moisture released in the latter operation and as a result less expansion of the product during frying may occur. The conditioning is often conducted in a hot oven at temperatures of about 50° to 70° C., involving times of about $\frac{1}{2}$ to 2 hours. The lowering of the moisture content during conditioning may make the pieces more stable which facilitates their storage and/or shipment after they are cut and before they are fried. The fried pieces prepared in accordance with this invention have good color, flavor and other characteristics and are generally crisp and sufficiently rigid to withstand undue breakage during the packaging, shipping and use.

The shaped dough pieces, either with or without conditioning or other intermediate treatment, containing the prefermented, highly dehydrated potato solids of the present invention may be fried in various ways. Ordinarily, such products are deep fat-fried by batch, continuous or semi-continuous procedures. The oils used in frying are generally stable oils of the cottonseed, peanut, corn or palm variety or mixtures thereof, and the oil temperature is often in the range of about 160° to 200° C. Frying times usually vary from about 10 seconds to 1 minute or so and are often less than about 30 seconds. The fried chips can be drained, shaken or blown or otherwise treated for excess oil removal, and the pieces seasoned with salt or other ingredients.

The following examples will serve to illustrate the present invention, and unless otherwise indicated, all percentages are by weight. The sugar values stated above and reported hereinafter are on the basis of potatoes which have been peeled.

EXAMPLE I

Raw white potatoes (100 lbs., Russet Burbank) having a moisture content of approximately 78%, a reducing sugar content of 2.76% (solids basis) and a total sugar content of 3.11% (solids basis) were peeled, trimmed to grade out blemishes and washed. The potatoes were then sliced into slabs about 0.5 inch in thickness. These slices were dipped in a 0.5% $NaHSO_3$ aqueous solution for 45 seconds. The slices were blanched by contact with steam in a chamber maintained at atmospheric pressure for 20 minutes. The blanched potato slices were water-washed to remove excess free starch from the surfaces of the slices. Excess water was drained from the potato slices, and they were then mashed in a Hobart meat grinder having a grinding plate with orifices 3/16 inch in diameter. The mashed potatoes were divided into two portions, designated A and B, respectively, and treated separately.

Portion A, having a moisture content of 80 to 82%, was combined with a 20% aqueous slurry of baker's yeast in an amount to provide in the mixture 0.3% yeast on a solids basis. The resulting material was fermented at 85° F. (29° C.) in an atmosphere of 85% relative humidity. A separate sample of the material was taken from the fermenting mixture at end of each of the first four hours of fermentation to provide samples $A_1$ to $A_4$, respectively. Each of the samples was drum dried at a temperature of 316° F. (157° C.) for about 8 to 9 seconds to provide flakes having a moisture content of 5 to 6%. Each sample of potato flakes was combined with sufficient water to give a dough of 48% solids content. The dough was analyzed for reducing sugar, and extruded into a ribbon 0.024 inch thick. The ribbon was cut into flat, round pellets. The pellets were dried in air for 4 to 6 hours, bagged, held overnight and fried in oil at 380° F. (193° C.) for 15 seconds. The fried chips were drained of oil and their color value was determined using a model M30-A Agtron spectural reflectance meter. In this test, the higher the color value, the lighter the color of the product and, correspondingly, the lower the value, the darker the color of the product. Products of preferred color have values in the 68 to 74 range. The results of the tests on the A samples are shown in Table I below.

Portion B of the mashed potatoes was drum dried similar to the samples of Portion A, but without intermediate fermentation. Portion B was made into a dough of 48% solids, and the dough was combined with yeast and fermented in the same manner as the samples of portion A. The moisture content of the mixture fermented was approximately 52%. A sample of the mixture was taken at the end of each of the first four hours of fermentation (samples $B_1$ to $B_4$), and each sample was analyzed for reducing sugar content, extruded, formed into pellets, and the pellets were dried in air, bagged, held overnight and fried, all in a manner similar to doing so with the samples of portion A. The color value of the fried samples was then determined as in the case of the samples from portion A, and the results are given in Table I.

TABLE I

| | Prefermentation | | Post fermentation | | |
|---|---|---|---|---|---|
| Sample | % Reducing Sugar* | Color Value | Sample | % Reducing Sugar | Color Value |
| $A_1$ | 2.06 | 48 | $B_1$ | 2.25 | 57 |
| $A_2$ | 1.46 | 66 | $B_2$ | 1.70 | 54 |
| $A_3$ | 0.21 | 69 | $B_3$ | 0.62 | 49 |
| $A_4$ | 0.05 | 72 | $B_4$ | 0.55 | 52 |

*Since in fermentation non-reducing sugars are converted to reducing sugars, the residual sugar is essentially all reducing sugar.

These data show that none of the postfermented samples $B_1$ to $B_4$ had a color value in the desired range of 65 to 75 even though their reducing sugar content was below that which in the case of the prefermented samples of this invention gave products of good color, compare $B_3$ and $B_4$ with $A_2$. In fact, the color values of samples $B_2$ to $B_4$ did not increase, and may even have deteriorated, as the amount of reducing sugar was lowered, and this effect has been obtained in the postfermentation procedure when the ratio of reducing sugars to total sugars in the raw potatoes is above about 0.6. In this case, the ratio was 2.76/3.11 or 0.89. When dealing with products of dark color below a 60 reflectance value in this test, the specific values obtained are often erratic.

EXAMPLE II

The following data are included to show that the slower fermentation rate and higher reducing sugar contents reported in the postfermented samples in Example I are not primarily the result of the postfermented material having a moisture content of 48%, rather than 80% as in the preferented material. Two mixtures having a moisture content of 48% and 80%, respectively, were prepared from commercially-available potato flakes which analyzed as follows:

| | |
|---|---|
| % Moisture | 6.50 |
| % Total Sugar | 2.99 |
| % Reducing Sugar | 2.53 |
| Reducing Sugar to Total Sugar Ratio (R/T) | 0.85 |

A slurry composed of 20% baker's yeast in water was added to each of the potato flake-water mixtures in an amount sufficient to provide 0.3% yeast on a solids basis. The resulting mixtures were then fermented for four hours at 85° F. (29° C.) in an atmosphere of 85% relative humidity. At the beginning, end, and each 30 minute interval during the fermentation, a sample of each mixture was taken and analyzed for reducing sugar content with the following results being obtained.

| | & Reducing Sugar | |
|---|---|---|
| Fermentaton Time, hours | 48% Moisture | 80% Moisture |
| 0.0 | 2.41 | 2.95 |
| 0.5 | 1.90 | 2.46 |
| 1.0 | 1.68 | 1.41 |
| 1.5 | 1.33 | 0.86 |
| 2.0 | 1.01 | 0.70 |
| 2.5 | 0,65 | 0.68 |
| 3.0 | 0.64 | 0.72 |
| 3.5 | 0.55 | 0.85 |
| 4.0 | 0.49 | 0.58 |

Although the mixture having 80% moisture exhibited a somewhat faster fermentation rate from 0.5 to 2 hours, the fermentation proceeded very little, if at all, afterwards, and the reducing sugar content was still above 0.5%. The fermentation of the mixture containing 48% moisture also showed little, if any, progress after 2 hours, and the reducing sugar content of the mixture was very close to or above the 0.5% level.

EXAMPLE III

The apparent effect in the fermentation of potato flakes of a relatively high reducing sugar to total sugar (R/T) ratio is seen in the following data. Thus, separate lots of high and low R/T ratio potato flakes were fermented in essentially the same manner as described with respect to the postfermented material in Example I. The data were as follows:

TABLE II

| TEST I: | High Ratio Flakes | Total Sugar | 3.22% |
| | Lot: Rogers 4053 | Reducing Sugar | 2.82% |
| | | Ratio | 0.88 |

| Ferm. Time Hours | % Reducing Sugar | % Glucose | % Fructose |
| --- | --- | --- | --- |
| 0 | 2.87 | 2.37 | 0.50 |
| 1 | 2.00 | 1.00 | 0.99 |
| 2 | 1.04 | 0.11 | 0.93 |
| 3 | 0.52 | 0 | 0.52 |
| 4 | 0.48 | 0 | 0.48 |

| TEST II: | Idaho Supreme L044 | Total Sugar | 2.86% |
| | | Reducing Sugar | 0.93% |
| | | Ratio | 0.33 |

| Ferm. Time Hours | % Reducing Sugar | % Glucose | % Fructose |
| --- | --- | --- | --- |
| 0 | 1.58 | 1.17 | 0.41 |
| 1 | 1.20 | 0.72 | 0.48 |
| 2 | 0.29 | 0.04 | 0.25 |
| 3 | 0.11 | 0 | 0.11 |
| 4 | 0.09 | 0 | 0.09 |

These data show that the high R/T ratio flakes in Test I had a much slower fermentation rate than the low R/T ratio flakes in Test II. The fermentation rate after 4 hours is very slow, which means that with the high ratio flakes, the reducing sugar content would not reach the most desired low level within a feasible time, if at all.

EXAMPLE IV

In essence, the procedure of Example I was repeated using as the raw material Russett Burbank potatoes having a lower total sugar content than the potatoes in Example I, i.e., a total sugar content of 2.52% (R/T ratio = 0.77) rather than 3.11% (R/T ratio = 0.89). The results were as follows:

TABLE III

POSTFERMENTATION

| Ferm. Time Hours | % Reducing Sugar | % Glucose | % Fructose | Color Value of Fried Chips |
| --- | --- | --- | --- | --- |
| 0 | 1.93 | 0.94 | 0.99 | 44 |
| 1 | 1.82 | 0.78 | 1.04 | 31 |
| 2 | 1.79 | 0.69 | 1.10 | 31 |
| 3 | 1.27 | 0.42 | 0.85 | 39 |
| 4 | 0.96 | 0.27 | 0.69 | 44 |

PREFERMENTATION

| Ferm. Time Hours | % Reducing Sugar | % Glucose | % Fructose | Color Value of Fried Chips |
| --- | --- | --- | --- | --- |
| 0 | 1.93 | 0.94 | 0.99 | 44 |
| 1 | 2.29 | 0.93 | 1.37 | 40 |
| 2 | 1.37 | 0.23 | 1.15 | 46 |
| 3 | 1.05 | 0.04 | 1.02 | 59 |
| 4 | 0.48 | 0 | 0.48 | 69 |

Again, in this example, the fermentation of the dough made from the highly dehydrated potato flakes, i.e., postfermentation, proceeded slower and, significantly, the color of fried products was unacceptable even with the sample that was fermented for four hours. In the case of fermentation before forming the flakes, i.e., prefermentation, the lower of the reducing sugar content proceeded at a greater rate, and fried chips made from a dough prepared from the four hour fermentation sample had a highly desirable color.

EXAMPLE V

The fermentation of each of several different kinds of undried, white potatoes was done by peeling, trimming to grade out blemishes and washing the potatoes. The potatoes were then sliced, treated with $NaHSO_3$ solution, blanched, water-washed and mashed essentially by the procedure set forth in Example I. Each of the separate potato samples was combined with yeast and fermented according to the procedure of Example I. Reducing sugar analyses on a solids basis were made on samples taken from each fermentation at the beginning and the end of each hour of the 4-hour fermentation period. The following data were obtained:

TABLE IV

| | Raw Potato Analysis | | | |
| --- | --- | --- | --- | --- |
| | *RB-38 | FL-38 | FL-55 | RB-55 |
| % Moisture | 6.2 | 6.5 | 7.1 | 6.9 |
| % Total Sugar | 5.96 | 6.33 | 1.35 | 3.0 |
| % Reducing Sugar | 5.24 | 2.34 | 0.28 | 2.31 |
| R/T Ratio | 0.88 | 0.37 | 0.21 | 0.77 |

| Fermentaton | Reducing Sugar Content, % | | | |
| --- | --- | --- | --- | --- |
| Time, Hours | RB-38 | FL-38 | FL-55 | RB-55 |
| 0 | 5.39 | 6.33 | 1.35 | 2.90 |
| 1 | 3.91 | 4.54 | 0.93 | 0.87 |
| 2 | 2.88 | 2.50 | 0.15 | 0.12 |
| 3 | 0.98 | 0.20 | 0.00 | 0.05 |
| 4 | 0.15 | 0.00 | 0.00 | 0.00 |

*RB indicates Russett Burbank type, FL indicates Frito-Lay type, and the number after each designation indicates the storage temperature in degrees Fahrenheit which resulted in the different sugar contents.

The data regarding samples FL-55 and RB-55 show that the fermentation of the potatoes having a relatively low initial content of total sugar up to about 3% proceeded to about the same sugar level at each given time period and until essentially no sugar remained. In the case of the FL-55 sample, the R/T ratio was only 0.21 while that for the RB-55 sample was a relatively high 0.77. When the sugar content of the raw potatoes was higher, as in the case of the FL-38 and RB-38 samples, the high R/T ratio in the RB-38 sample apparently caused a slower rate of fermentation than experienced with the FL-38 sample which had a low R/T ratio. The fermentation of each of the samples proceeded, however, to a reducing sugar content of below 0.2% within the four hour period.

It is claimed:

1. A process of making potato products of good color characteristics comprising fermenting potatoes whose reducing sugar content is at least about 1 weight percent so that the potatoes, when fried, brown to an undesirable extent, said potatoes having a reducing sugar to total sugar ratio of at least about 0.6 and not having been dried to a moisture content below about 10 weight percent, said potatoes being fermented in a mixture having sufficient moisture for fermentation, said fementation lowering the reducing sugar content of said potatoes sufficiently to decrease the browning characteristics of said potatoes upon frying, drying said fermented potatoes at a temperature of about 95 to 180° C. to a moisture content below about 10 weight percent in the form of potato flakes, and frying potato products made from said potato flakes.

2. A process of claim 1 in which said mixture which is fermented has a moisture content of at least about 70 weight percent.

3. The process of claim 1 in which the potatoes before fermenting have a reducing sugar content of at least about 2 weight percent on a solids basis, and the fermentation is continued until the potatoes have a reducing sugar content of up to about 0.5 weight percent on a solids basis.

4. A process of making potato products of good color characteristics when fried which comprises blanching potatoes whose reducing sugar content is at least about 1 weight percent and in which the reducing sugar to total sugar ratio is at least about 0.6, fermenting the blanched potatoes in a mixture having a moisture content of at least about 70 weight percent, said potatoes which are fermented not having been dried to a moisture content below about 10 weight percent, drying the fermented potatoes at a temperature of about 95 to 180° C. in the form of potato flakes having a moisture content below about 10 weight percent, rehydrating said flakes to form dough having a moisture content in the range of about 25-60 weight percent, forming the dough into potato pieces, drying said pieces to a moisture level suitable for frying and deep fat frying said dried potato pieces to obtain products of good color characteristics.

5. The process of claim 4 in which said dough is formed into potato chips.

6. The process of claim 4 in which the material charged to said drying for making potato flakes has a moisture content of at least about 70 weight percent.

7. The process of claim 6 in which said dough is formed by combining said potato flakes with potatoes having a moisture content of at least about 70 weight percent.

8. A process of making potato products of good color characteristics when fried, comprising fermenting potatoes whose reducing sugar content is at least about 1 weight percent so that the potatoes, when fried, brown to an undesirable extent, said potatoes having a reducing sugar to total sugar ratio of at least about 0.6 and not having been dried to a moisture content below about 10 weight percent, said potatoes being fermented in a mixture having sufficient moisture for fermentation, said fermentation lowering the reducing sugar content of said potatoes sufficiently to decrease the browning characteristics of said potatoes upon frying, and drying said fermented potatoes at a temperature of about 95° to 180° C. to a moisture content below about 10 weight percent in the form of potato flakes.

9. A process of claim 8 in which said mixture which is fermented has a moisture content of at least about 70 weight percent.

10. A process of claim 9 in which the material charged to said drying for making potato flakes has a moisture content of at least about 70 weight percent.

11. The process of claim 10 in which the potatoes before fermenting have a reducing sugar content of at least about 2 weight percent on a solids basis, and the fermentation is continued until the potatoes have a reducing sugar content of less than about 0.5 weight percent on a solids basis.

12. A process of making potato products of good color characteristics when fried, which comprises blanching potatoes whose reducing sugar content is at least about 1 weight percent and in which the reducing sugar to total sugar ratio is at least about 0.6, fermenting the blanched potatoes in a mixture having a moisture content of at least about 70 weight percent, said potatoes which are fermented not having been dried to a moisture content below about 10 weight percent, and drying the fermented potatoes at a temperature of about 95° to 180° C. in the form of potato flakes having a moisture content below about 10 weight percent.

13. The process of claim 12 in which the material charged to said drying to make potato flakes has a moisture content of at least about 70 weight percent.

* * * * *